United States Patent Office 3,049,129
Patented Aug. 14, 1962

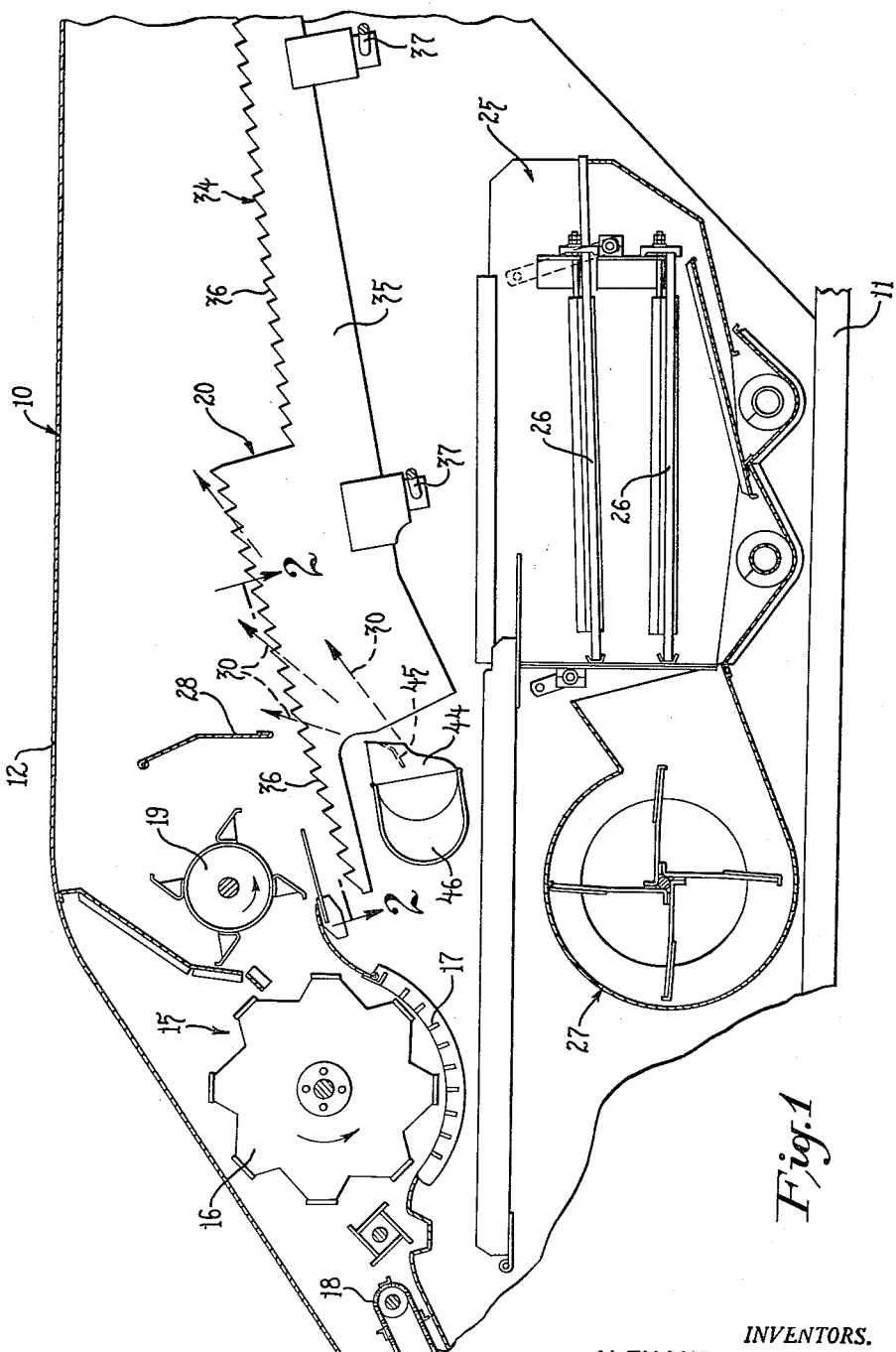

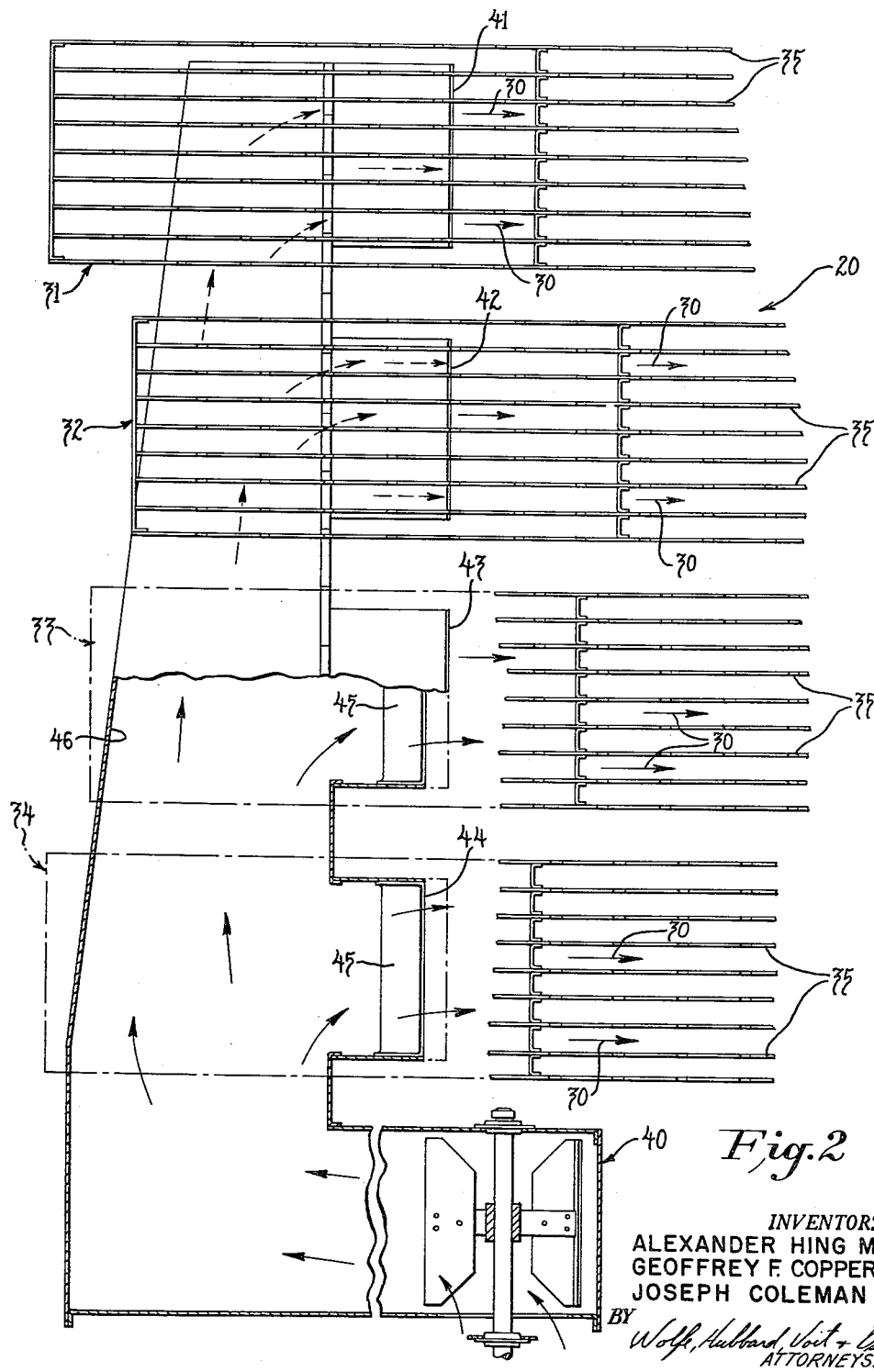

3,049,129
STRAW WALKERS HAVING CLOSELY SPACED SAW-TOOTHED PLATES
Alexander Hing Mark, Livonia, Mich., and Geoffrey F. Cooper, Toronto, Ontario, and Joseph Coleman, Downsview, Ontario, Canada, assignors to Massey-Ferguson Inc., Racine, Wis., a corporation of Maryland
Filed June 8, 1959, Ser. No. 818,767
1 Claim. (Cl. 130—26)

The present invention relates generally to agricultural harvesting and threshing machines, or combines, and concerns more particularly the separation of grain kernels from the associated straw, chaff and trash which is harvested with the grain.

Present day combines utilize three basic assemblies for separating the grain kernels from the material making up the remainder of the harvested mass. These units are the beater or thresher assembly, usually in the form of a cylinder and cooperating concave; the straw walker assembly, usually in the form of a plurality of adjacent, oscillating, rack-like members; and the shaker shoe assembly, usually in the form of screens overlying an upwardly directed blast of air from a fanning mill.

In combines of the above types, designers and manufacturers have aimed at obtaining an over-all operating efficiency of approximately 98½%. In other words, it has been the objective to separate and clean 98½% of the grain kernels harvested and to permit only 1½% of the grain to be discharged with the straw material and lost.

As has been well known to those skilled in the art, maintaining combine efficiency has become more and more difficult in recent years. The conventional combine grain separating units referred to above function most efficiently at an optimum loading which is somewhat below their peak capacity. Although the average yield of grain per acre has steadily increased through modern farming methods, combine operators continue to operate their machines as rapidly as possible. Thus, the grain separating units have been pushed to the limits of their capacity with the result that combine efficiency has fallen off.

Accordingly, it is the primary object of the present invention to provide a novel structure and method for substantially increasing combine efficiency, particularly when the grain separating units of the combine are operating at high capacity.

In more detail, it is an object to provide a combine with a novel form of straw walker construction together with a fan and a system of air ducts arranged to cooperate with the straw walkers so as to greatly increase the grain separating efficiency of the combine.

Moreover, it is an object to provide a straw walker, fan and air duct assembly as characterized above which is economical to manufacture, easy to install in standard combines, and trouble-free throughout long periods of heavy-duty operation.

It is also an object of the invention to provide a structure as referred to above which can be easily and economically embodied in present combines without drastic revision of combine design, either as original equipment on new machines or as a modernizing feature on machines already in use.

Other objects and advantages of the invention will become apparent upon reading the following detailed description, and upon reference to the drawings in which:

FIGURE 1 is a vertical transverse section showing a fragment of a combine in which the present invention is embodied; and FIG. 2 is an enlarged fragmentary section taken approximately along the line 2—2 of FIG. 1, and in which certain portions of the structure have been broken away.

While the invention will be described in connection with a preferred embodiment and procedure, it will be understood that we do not intend to limit the invention to that embodiment or procedure. On the contrary, we intend to cover all alternatives, modifications and equivalents as may be included within the spirit and scope of the invention as defined by the appended claims.

Turning now to the drawings, FIG. 1 shows a portion of a combine 10 in which the invention has been embodied. The combine portion illustrated includes a main frame or chassis 11 which supports a combine body housing 12 and the assemblies for separating grain kernels from the associated straw, chaff and trash which is harvested with the grain.

The grain separation assemblies include a beater or thresher assembly 15 having a rotatably driven cylinder 16 and a cooperating concave 17. Harvested material is carried to the thresher assembly 15 by an elevator 18, of which only a portion is shown, and the material is discharged rearwardly from the thresher assembly by a rapidly driven rear beater 19.

Positioned behind the thresher assembly is a straw walker assembly 20 which receives the threshed material from the thresher assembly 15, and located beneath the straw walker assembly 20 is a shaker shoe assembly 25 which includes a plurality of screens 26 disposed in the path of an air blast generated by a fanning mill 27.

As will be well understood by those skilled in the art, the material harvested by the combine 10 is gathered at the front end of the combine and lifted by the elevator 18 to the thresher assembly 15. The harvested material is beaten or threshed by the rotating cylinder 16 against the concave 17 so as to dislodge and loosen the grain kernels from the associated straw and trash. The harvested mass is then thrown rearwardly from the thresher assembly in a generally horizontal direction onto the straw walkers of the assembly 20, with the rear beater 19 directing and controlling the impetus given to the rearward movement of the material.

Preferably, a curtain 28 is disposed behind the rear beater 19 to control the throw of the harvested material. The curtain 28 is flexible so that it may deflect upwardly to permit the passage of heavy loads of harvested material.

The straw walker assembly 20 serves both as a straw and trash conveyor to "walk" the straw and trash rearwardly and out of the combine and also as an agitated screen to shake the grain kernels loose from the remainder of the harvested mass and allow them to drop downwardly. The grain kernels which are separated from the harvested material by the thresher assembly 15 and by the straw walker assembly 20 fall beneath these assemblies and are channeled onto the shaker shoe screens 26 where the air blast from the fanning mill 27 completes the grain cleaning and separating operation in the combine.

In accordance with the present invention, the straw walkers in the assembly 20 are vertically open and a blast of air is directed upwardly through the vertically open walkers against the harvested material as it falls onto the walkers. Preferably, this air blast, designated by the arrows 30, is inclined rearwardly in the direction of grain movement and impinges against the mass of harvested material at the point where the majority of loosened grain kernels thrown rearwardly from the thresher assembly lose their horizontal momentum and begin to drop downwardly.

Considering the illustrated straw walker assembly and the means for supplying the air blast designated by arrows 30 before turning in detail to the effects of this combination, it will be noted that the assembly 20 of the present embodiment is made up of four adjacent, relatively oscillatable straw walkers 31, 32, 33 and 34. Each of the walkers 31–34 are formed of a plurality of rigidly joined, closely spaced plates 35 which are disposed vertically so that the straw walkers are vertically open.

The plates 35 are substantially identical to one another and each has a saw-toothed upper edge 36 running in the direction of the thrown harvested material. The walkers 31–34 are mounted individually on cranks 37 which, when driven, give the straw walkers a staggered, four-way motion that is effective to "walk" the straw and trash rearwardly out of the combine.

In the illustrated embodiment, the air blast passing up through the straw walkers is produced by an air blast generating fan 40 mounted at one side of the combine which supplies air to a plurality of air discharge ducts 41, 42, 43 and 44 positioned, respectively, beneath the straw walkers 31–34. In the illustrated consrtuction, each one of the ducts 41–44 is provided with an intermediate baffle plate 45 to aid in properly directing the air upwardly and rearwardly through the straw walkers.

In order to carry air from the fan 40 to the ducts 41–44, a converging passageway 46 is provided which serves to distribute the air propelled by the fan 40 between the ducts 41–44 so that air blasts of approximately equal magnitude are discharged from each one of the ducts.

There are several important effects of the procedure and arrangement described above. First, the air blast designated by the arrows 30 is effective to cause the solid, rapidly moving stream of grain, straw, chaff and trash discharged by the rear beater 19 to open up and expand rather than allowing the material to tumble and tightly pile up. The air blast fluffs the harvested material and keeps it open, porous and loose. Under these conditions, the grain kernels readily separate from the remainder of the harvested mass, for two basic reasons. One, the kernels being heavier than the associated chaff, are drawn downwardly through the loosely fluffed mass by the force of gravity. Two, the kernels, being small and rounded, are less affected by an air stream than the associated material and hence the kernels drop downwardly through the air blast while the larger surrounding particles are suspended or carried upwardly.

A second important effect of the described method and construction is that the air blast indicated by the arrows 30 drives off the chaff portion of the harvested material. Since the chaff is extremely light, the air blast lifts it upwardly and rearwardly so that it does not have a chance to fall down and become intertwined and matted either on the straw walkers or on the screens 26 of the shaker shoe assembly and these mechanisms therefore do not become clogged and inefficient.

Another important result of the present arrangement is to facilitate prompt separation of the grain kernels from the remainder of the harvested mass at the extreme forward end of the straw walker assembly 20. In other words, substantially all of the grain kernels are separated while the harvested material is kept loose and fluffy by the upwardly directed air blast, and therefore few kernels remain associated with the straw and trash when the latter are carried over the rear portion of the straw walker assembly. With conventional arrangements it has been found that the straw and chaff passing along the straw walker assembly tends to form a mat that entraps remaining grain kernels. The entrapped grain is ultimately discharged with the straw and chaff and is lost.

Still another advantage of the present invention is that the straw walkers can be operated at higher speeds to achieve faster straw "walkout." In other words, since the air blast indicated by the arrows 30 facilitates faster separation of the grain from the remainder of the harvested material, the entire mass of material can be carried rearwardly more rapidly by driving the straw walkers at a higher rate. Thus, the layer of material being supported and moved by the straw walkers will be thinner so that there is very little tendency for this material to pack down or become matted.

The over all result of the above specific operating features is that the present invention is able to greatly extend the capacity of a combine by maintaining high separation efficiency when the combine is loaded up to and far above "normal" capacity. As was previously pointed out, the efficiency of a combine, that is, its ability to separate and recover grain from the harvested mass, begins to drop off sharply as the grain separating assemblies are loaded more and more heavily. This drop in efficiency thus imposes a practical limitation on the capacity of conventional combines. However, in a combine embodying the present invention and for the reasons described above, it has been found that efficiency does no drop off appreciably at the former top capacity levels so that the grain separating assemblies can be operated at much higher loadings without sacrificing grain separation efficiency.

It has been found that for best results the air blasts indicated by the arrows 30 should preferably impinge against the threshed mass of material just as it falls onto the straw walkers, and that the air blasts should be aimed in the direction of grain movement as well as upwardly. Furthermore, the air blast velocities at the top of the straw walkers found to be most effective lie in the range of 1800 to 2800 feet per minute.

It can be seen that the invention can be practiced by utilizing straw walker, fan, and air duct constructions which are quite economical to manufacture and which can be easily installed either as original equipment on new machines or as a modification to existing machines.

It can also be appreciated that the parallel plate construction of the straw walkers 31–34 provides particularly good support for conveying straw and trash while offering very little interference to either the air blast or falling grain kernels. Furthermore, the parallel plates channel the air being driven upwardly so that it passes smoothly through the straw walkers and against the harvested material.

We claim as our invention:

In a combine, the combination comprising, a thresher assembly for operating on harvested material and adapted to throw the threshed material in a generally horizontal direction, a plurality of adjacent, relatively oscillatable straw walkers positioned to receive the thrown material, each of said straw walkers being formed of closely spaced, vertically disposed plates having saw-toothed upper edges running in the direction of the thrown material, a shaker shoe assembly for receiving the separated grain, an air blast generating fan assembly having discharge ducts positioned above said shaker shoe assembly and beneath said straw walkers so as to direct blasts of air upwardly through the spaced straw walker plates so as to fluff the harvested material and keep it loose and porous.

References Cited in the file of this patent

UNITED STATES PATENTS

| 792,516 | Hanlon et al. | June 13, 1905 |
| 810,625 | Crane | Jan. 23, 1906 |
| 976,306 | Sipler | Nov. 22, 1910 |
| 1,415,896 | Plummer | May 16, 1922 |
| 1,620,644 | Goffin | Mar. 15, 1927 |
| 1,884,114 | Moroney | Oct. 25, 1932 |
| 2,887,226 | Angus | May 19, 1959 |

FOREIGN PATENTS

| 629,871 | France | Aug. 8, 1927 |